(12) United States Patent
Saulnier

(10) Patent No.: US 7,565,806 B2
(45) Date of Patent: Jul. 28, 2009

(54) METHOD AND SYSTEM FOR SUPPLYING AN AIR SEPARATION UNIT BY MEANS OF A GAS TURBINE

(75) Inventor: Bernard Saulnier, La Garenne Colombes (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 724 days.

(21) Appl. No.: 10/564,310

(22) PCT Filed: Jul. 21, 2004

(86) PCT No.: PCT/FR2004/050347

§ 371 (c)(1),
(2), (4) Date: Jan. 11, 2006

(87) PCT Pub. No.: WO2005/012814

PCT Pub. Date: Feb. 10, 2005

(65) Prior Publication Data

US 2006/0201159 A1 Sep. 14, 2006

(30) Foreign Application Priority Data

Jul. 30, 2003 (FR) .................................. 03 50389

(51) Int. Cl.
*F02C 7/00* (2006.01)
(52) U.S. Cl. .................... 60/783; 60/801; 60/39.182
(58) Field of Classification Search .............. 60/39.182, 60/783, 801, 772
See application file for complete search history.

(56) References Cited

U.S. PATENT DOCUMENTS

| 3,731,495 A | 5/1973 | Coveney |
| 4,557,735 A | 12/1985 | Pike |
| 5,131,225 A * | 7/1992 | Roettger ..................... 60/785 |
| 5,317,862 A | 6/1994 | Rathbone |
| 5,410,869 A | 5/1995 | Muller |

(Continued)

FOREIGN PATENT DOCUMENTS

EP 0 568 431 11/1993

(Continued)

OTHER PUBLICATIONS

International Search Report for PCT/FR2004/050347.

*Primary Examiner*—William H Rodriguez
(74) *Attorney, Agent, or Firm*—Elwood Haynes

(57) ABSTRACT

According to the inventive method, incoming air enters (via 16) the separation unit (14); at least one fraction of said incoming air is supplied from the gas turbine (2), and at least one gas flow (via 20,24), which is enriched with nitrogen, is extracted from the separation unit (16); heat exchange occurs in a first exchanger (56) between the fraction of incoming air from the gas turbine (2) and a liquid fraction (58) to be heated in order to obtain a first heated liquid fraction (58); said heated liquid fraction (58) is added to a liquid mixture fraction (48) in order to obtain a liquid fraction to be cooled (60); heat exchange occurs between said liquid fraction which is to be cooled and the nitrogen-enriched gas flow in a second exchanger (50).

13 Claims, 2 Drawing Sheets

U.S. PATENT DOCUMENTS

Figure 1:
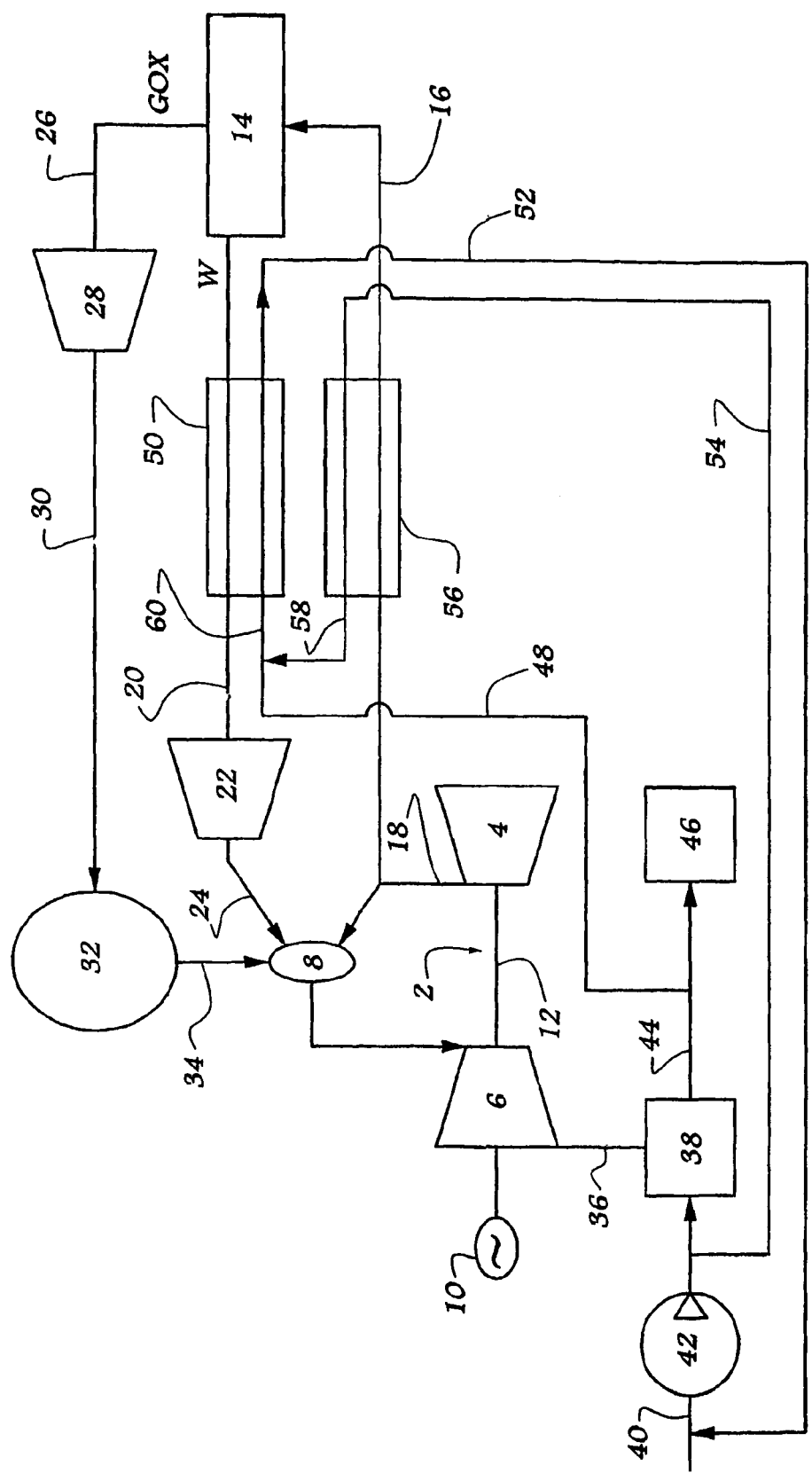

| | | | |
|---|---|---|---|
| 5,664,411 A * | 9/1997 | Shao | 60/776 |
| 5,724,805 A * | 3/1998 | Golomb et al. | 60/783 |
| 5,865,023 A * | 2/1999 | Sorensen et al. | 60/775 |
| 6,282,901 B1 * | 9/2001 | Marin et al. | 60/649 |
| 6,295,838 B1 | 10/2001 | Mahoney et al. | |
| 6,345,493 B1 * | 2/2002 | Smith et al. | 60/772 |
| 2004/0016237 A1 * | 1/2004 | Marin et al. | 60/783 |
| 2004/0200224 A1 * | 10/2004 | Peyron | 60/772 |
| 2007/0033943 A1 * | 2/2007 | Benz et al. | 60/772 |
| 2007/0204620 A1 * | 9/2007 | Pronske et al. | 60/671 |
| 2008/0010995 A1 * | 1/2008 | Peyron | 60/783 |
| 2008/0115483 A1 * | 5/2008 | Moore et al. | 60/39.461 |
| 2008/0202123 A1 * | 8/2008 | Sullivan et al. | 60/781 |

FOREIGN PATENT DOCUMENTS

| | | |
|---|---|---|
| EP | 1 043 557 | 10/2000 |
| JP | 57 183529 | 11/1982 |

* cited by examiner

METHOD AND SYSTEM FOR SUPPLYING AN AIR SEPARATION UNIT BY MEANS OF A GAS TURBINE

The present invention relates to a method and an installation for supplying an air separation unit using a gas turbine.

A gas turbine conventionally comprises a compressor, a combustion chamber and an expansion turbine, coupled with the compressor to drive it. This combustion chamber receives a flue gas, and a certain quantity of nitrogen, for lowering the flame temperature in the combustion chamber, thereby minimizing the release of nitrogen oxides to the atmosphere.

In a known manner, the flue gas can be obtained by gasification, that is, by oxidation of carbon-containing products, such as coal or petroleum residues. This oxidation is carried out in an independent unit, called a gasifier.

Conventionally, it is possible to associate this gas turbine with an air separation unit. The latter, which is commonly a cryogenic unit comprising at least one distillation column, uses air to supply at least one gas stream mainly consisting of one of the gases of air, particularly oxygen or nitrogen.

The combination of this air separation unit with the gas turbine benefits from at least one of the two abovementioned gas streams. For this purpose, the oxygen and nitrogen produced in the air separation unit are sent respectively to the gasifier and the combustion chamber.

A particular object of the invention is the combined use of a gas turbine and an air separation unit, in which the incoming air, delivered to this separation unit, is at least partly supplied by the gas turbine.

For this purpose, the compressor discharge circuit of this gas turbine communicates with the inlet of the separation unit, replacing or supplementing an external feed compressor. This arrangement is described in particular in EP-A-0 568 431.

The air fraction from the gas turbine, of which the temperature is greater than 350° C., must be cooled before entering the air separation unit. Moreover, the waste nitrogen gas stream should have the highest possible temperature when it enters the combustion chamber.

Under these conditions, U.S. Pat. No. 3,731,495 proposes to create heat exchange between the air issuing from the gas turbine and the waste nitrogen stream, in order to make their respective temperatures uniform.

This known solution nevertheless has certain drawbacks.

In fact, the waste nitrogen flow, and the air flow from the gas turbine, depend exclusively on the characteristics of the latter, and on the composition of the flue gas entering the combustion chamber. These flows are accordingly liable to be very substantially different to one another.

Thus, the air flow from the gas turbine may be particularly low, so that the waste nitrogen stream cannot be heated above 200° C. Such a temperature is unacceptable, insofar as this waste nitrogen must enter the combustion chamber at at least 290° C.

The invention proposes to overcome this drawback.

For this purpose, the subject of the invention is a method for supplying an air separation unit using a gas turbine, in which incoming air enters an inlet of said separation unit, at least a fraction of said incoming air is supplied from said gas turbine, at least one nitrogen-enriched gas stream is extracted from the separation unit, and this nitrogen-enriched gas stream is heated, characterized in that, to heat the nitrogen-enriched gas stream, heat exchange occurs between the fraction of incoming air issuing from the gas turbine and a liquid fraction to be heated in a first heat exchanger, in order to obtain a heated liquid fraction, this heated liquid fraction is added to a liquid mixture fraction, in order to obtain a liquid fraction to be cooled, and heat exchange occurs between this liquid fraction to be cooled and the nitrogen-enriched gas stream in a second heat exchanger.

According to other characteristics of the invention:
at least part of the liquid mixture fraction is supplied from the outlet of a boiler,
at least part of the liquid fraction cooled in the second heat exchanger is returned to the inlet of a boiler,
this boiler is supplied with energy using the gas turbine,
at least part of the liquid fraction cooled in the second heat exchanger is returned to the inlet of the first heat exchanger,
countercurrent heat exchange occurs between the liquid fraction to be heated and the incoming air fraction issuing from the gas turbine, and also between the liquid fraction to be cooled and the nitrogen-enriched gas stream,
the liquid is water.

A further subject of the invention is an installation for supplying an air separation unit using a gas turbine, comprising a gas turbine comprising compressed air supply means, particularly a compressor, an air separation unit comprising incoming air supply means comprising at least first supply means, associated with the supply means of the gas turbine, as well as means for removing at least one nitrogen-enriched gas stream, this installation further comprising means for heating the nitrogen-enriched gas stream, characterized in that these heating means comprise a first heat exchanger, in which the first incoming air supply means circulate, intake means for a liquid fraction to be heated, terminating at the inlet of the first heat exchanger, means for removing a heated liquid fraction, communicating with the outlet of the first heat exchanger, a second heat exchanger, in which means for removing the nitrogen-enriched gas stream circulate, intake means for a liquid fraction to be cooled, communicating with the inlet of the second heat exchanger, and means for removing a cooled liquid fraction, communicating with the outlet of the second heat exchanger, and in that the means for removing the heated liquid fraction communicate with the intake means for the liquid fraction to be cooled.

According to other characteristics of the invention:
the intake means for the liquid fraction to be cooled communicate with a boiler,
the means for removing the cooled liquid fraction communicate with the inlet of a boiler,
energy supply means are provided, extending between the gas turbine and this boiler,
the intake means for the liquid fraction to be heated communicate with the means for removing the cooled liquid fraction,
the heat exchangers are of the countercurrent type.

Figure 2:
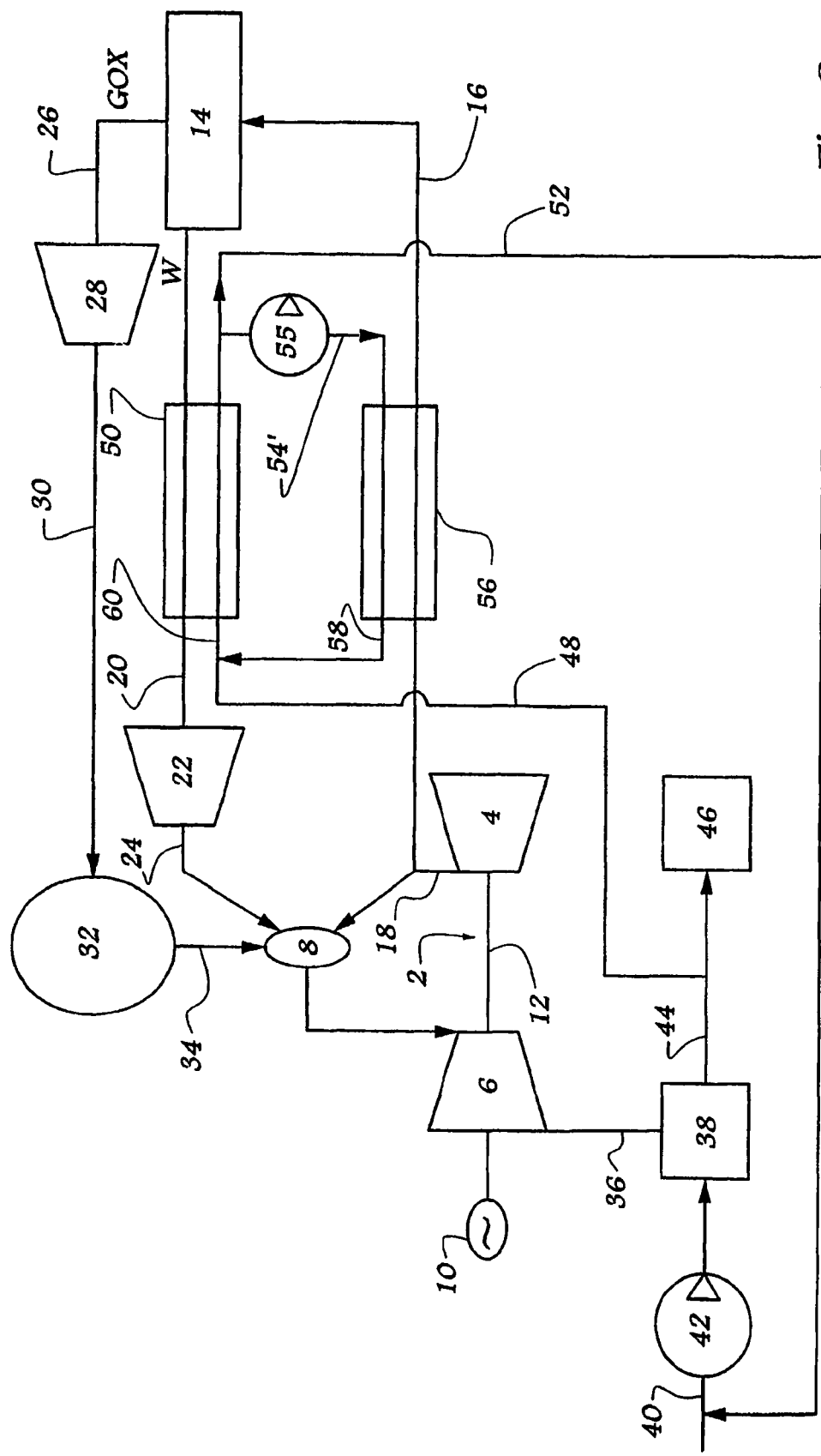

The invention is described below, with reference to the drawings appended hereto, provided exclusively as nonlimiting examples, in which FIGS. 1 and 2 are schematic views showing installations according to two embodiments of the invention.

The installation shown in FIGS. 1 and 2 comprises a gas turbine, denoted as a whole by the numeral 2, which comprises, conventionally, an air compressor 4, an expansion turbine 6, coupled with the compressor 4, and a combustion chamber 8. This gas turbine 2 is also provided with an AC generator 10, driven by a shaft 12, common to the compressor 4 and to the turbine 6.

The installation in FIG. 1 also comprises an air separation unit, of a known type, denoted as a whole by the numeral 14.

The inlet of this separation unit 14 is supplied with air via a line 16, which communicates with the discharge circuit 18 of the compressor 4.

The separation unit operates by a cryogenic method and for this purpose, comprises a plurality of distillation columns, not shown.

A line 20 removes a first waste nitrogen stream W, containing a few % of oxygen, outside the unit 14. This line 20 terminates in a compressor 22, downstream of which a line 24 extends, terminating in the combustion chamber 8.

A line 26 removes an oxygen-rich gas stream GOX outside the unit 14. This line 26 terminates in a compressor 28, downstream of which a line 30 extends. This line terminates in a gasifier 32, of a conventional type, which is supplied by a tank, not shown, containing carbon products, such as coal.

A line 34, extending downstream of the gasifier 32, conveys the flue gas produced by the oxidation of the above carbon-containing products. This line 34 communicates with the combustion chamber 8 of the gas turbine.

The expansion turbine 6 of the gas turbine 2 is connected, via a line 36, with a boiler 38 for recuperating the heat of the flue gases, expanded at the outlet of this turbine 6. This boiler 38, via a line 40 equipped with a pump 42, receives water that is heated in this boiler and is removed via a line 44. This line terminates in a high pressure steam generation zone, of a conventional type, which is denoted by the numeral 46.

A line 48, branched to the line 44, terminates at the inlet of a heat exchanger. The latter also receives the line 20 conveying the waste nitrogen.

A line 52, which removes the water conveyed by the line 48, connects the outlet of the heat exchanger 50 with the line 40. This line 52 terminates in this line 40, upstream of the pump 42.

Furthermore, a line 54 is branched to the line 40, downstream of the pump 42. This line 54 communicates with the inlet of a heat exchanger 56, similar to the heat exchanger 50. This heat exchanger 56 also receives the line 16, conveying the incoming air fraction issuing from the gas turbine 2.

A line 58 also connects the outlet of the heat exchanger 56 with the line 48, for conveying water to the first heat exchanger 50. The numeral 60 denotes the end of the line 48, extending downstream of the outlet of the line 58.

The operation of the above installation is now described below, with reference to FIG. 1.

The air separation unit 14 receives compressed air from the compressor 4 and, in a conventional manner, produces two gas streams, respectively enriched with nitrogen and oxygen, which are conveyed via the line 20 and the line 26.

The oxygen-enriched gas stream enters the gasifier 32, which also receives carbon-containing products, such as coal. The oxidation carried out in this gasifier leads to the production of flue gas, delivered by the line 34, that supplies the combustion chamber 8 of the gas turbine. The latter also receives the nitrogen-enriched gas stream W via the line 24, and the compressed air from the compressor 4 via the line 18.

The gases produced by the corresponding combustion, mixed with the waste nitrogen, are sent to the inlet of the expansion turbine 6, where they expand and drive the turbine. Via the shaft 12, this also serves to drive the compressor 4 and the AC generator 10, which, for example, supplies a power distribution network, not shown.

The flue gases expanded at the outlet of the turbine 6 are used, in the boiler 38, to heat the water entering via the line 40. Thus, this water, of which the temperature is about 100° C. in the line 40, is heated to about 300° C. in the line 44.

Water to be heated, at about 100° C., is conveyed via the line 54 to the inlet of the heat exchanger 56. Heat exchange occurs between this water and the air fraction from the gas turbine 2, which is conveyed by the line 16.

Heated water is then removed from the heat exchanger 56 via the line 58. This heated water is then mixed with the water fraction withdrawn via the line 48, of which the temperature is about 300° C.

The corresponding water mixture is sent to the inlet of the heat exchanger 50, via the downstream end 60 of the line 48.

Heat exchange then occurs between this water to be cooled, conveyed via the end 60, and the waste nitrogen stream, flowing in the line 20.

The line 52 then sends a cooled water, of which the temperature is about 100° C., via the line 40. The waste nitrogen is also removed from the heat exchanger 50, via the line 20, at a temperature at which it enters the combustion chamber 8 under optimal conditions.

The respective flows of heated water and mixture water, conveyed respectively via the line 58 and the line 48, are such as to heat the waste nitrogen to about 290° C.

FIG. 2 shows a second embodiment of the installation according to the invention.

This variant differs from the installation shown in FIG. 1, in that the water to be heated is no longer withdrawn upstream of the boiler 38. Thus, as shown in FIG. 2, the water to be heated is withdrawn, via a line 54' from the cooled water stream, removed from the heat exchanger 50 via the line 52. A pump 55 circulates this water withdrawal.

The operation of the installation shown in this FIG. 2 is similar to that of the installation in FIG. 1.

The invention is not limited to the examples described and shown.

Thus, the combustion chamber 8 can be supplied using only the waste nitrogen produced by the air separation unit. In this arrangement, the flue gas, which is then, for example, natural gas, is not produced from the oxygen formed in the separation unit 2.

It is also possible to supply the separation unit 14 only partly using the turbine. An independent compressor is then provided, its outlet communicating with the line 16.

The objectives mentioned above can be achieved using the invention.

The use of two distinct liquid fractions optimally heats the waste nitrogen. In fact, this solution, on the one hand, benefits from the heat liberated by the air issuing from the gas turbine and, on the other, provides the quantity of auxilliary heat just necessary to heat the waste nitrogen, by varying the flow rate of the liquid mixture fraction, conveyed by the line 48.

The invention is also able to use the heat recovered in the boiler 38. Such a solution, which is advantageous in terms of energy, involves simple and inexpensive equipment. In fact, this boiler is necessarily close to the gas turbine, insofar as it is supplied by this turbine.

The invention claimed is:

1. A method for supplying an air separation unit using a gas turbine, in which incoming air enters an inlet of said separation unit, at least a fraction of said incoming air is supplied from said gas turbine, at least one nitrogen-enriched gas stream is extracted from the separation unit, and this nitrogen-enriched gas stream is heated, characterized in that, to heat the nitrogen-enriched gas stream, heat exchange occurs between the fraction of incoming air issuing from the gas turbine and a liquid fraction to be heated in a first heat exchanger, in order to obtain a heated liquid fraction, this heated liquid fraction is added to a liquid mixture fraction, in order to obtain a liquid fraction to be cooled, and heat exchange occurs between this liquid fraction to be cooled and the nitrogen-enriched gas stream in a second heat exchanger.

2. The supply method as claimed in claim 1 characterized in that at least part of the liquid mixture fraction is supplied from the outlet of a boiler.

3. The supply method as claimed in claim 2, characterized in that this boiler is supplied with energy using the gas turbine.

4. The supply method as claimed in claim 1, characterized in that at least part of the liquid fraction cooled in the second heat exchanger is returned to the inlet of a boiler.

5. The supply method as claimed in claim 1, characterized in that at least part of the liquid fraction cooled in the second heat exchanger is returned to the inlet of the first heat exchanger.

6. The supply method as claimed in claim 1, characterized in that countercurrent heat exchange occurs between the liquid fraction to be heated and the incoming air fraction issuing from the gas turbine, and also between the liquid fraction to be cooled and the nitrogen-enriched gas stream.

7. The supply as claimed in claim 1, characterized in that the liquid is water.

8. An installation for supplying an air separation unit using a gas turbine, comprising a gas turbine comprising compressed air supply means, particularly a compressor, an air separation unit comprising incoming air supply means comprising at least first supply means, associated with the supply means of the gas turbine, as well as means for removing at least one nitrogen-enriched gas stream, this installation further comprising means for heating the nitrogen-enriched gas stream, characterized in that these heating means comprise a first heat exchanger, in which the first incoming air supply means circulate, intake means for a liquid fraction to be heated, terminating at the inlet of the first heat exchanger, means for removing a heated liquid fraction, communicating with the outlet of the first heat exchanger, a second heat exchanger, in which means for removing the nitrogen-enriched gas stream circulate, intake means for a liquid fraction to be cooled, communicating with the inlet of the second heat exchanger, and means for removing a cooled liquid fraction, communicating with the outlet of the second heat exchanger, and in that the means for removing the heated liquid fraction communicate with the intake means for the liquid fraction to be cooled.

9. The installation as claimed in claim 8, characterized in that the intake means for the liquid fraction to be cooled communicate with a boiler.

10. The installation as claimed in claim 9, characterized in that energy supply means are provided, extending between the gas turbine and this boiler.

11. The installation as claimed in claim 8, characterized in that the means for removing the cooled liquid fraction communicate with the inlet of a boiler.

12. The installation as claimed in claim 8, characterized in that the intake means for the liquid fraction to be heated communicate with the means for removing the cooled liquid fraction.

13. The installation as claimed in claim 8, characterized in that the heat exchangers are of the countercurrent type.

* * * * *